June 22, 1948.    R. C. DEHMEL    2,443,604
AIRCRAFT TRAINING APPARATUS
Filed Feb. 3, 1944    4 Sheets-Sheet 1

INVENTOR
R. C. DEHMEL
BY: P. C. Smith
ATTORNEY

June 22, 1948.  R. C. DEHMEL  2,443,604
AIRCRAFT TRAINING APPARATUS

Filed Feb. 3, 1944  4 Sheets-Sheet 2

FIG. 2.

INVENTOR
R.C. DEHMEL
BY: P. C. Smith
ATTORNEY

Patented June 22, 1948

2,443,604

UNITED STATES PATENT OFFICE 2,443,604

AIRCRAFT TRAINING APPARATUS

Richard C. Dehmel, Summit, N. J., assignor to Bell Telephone Laboratories, Incorporated, New York, N. Y., a corporation of New York Application February 3, 1944, Serial No. 520,911

15 Claims. (Cl. 35—25)

This invention relates to aircraft training apparatus and more particularly to apparatus applicable thereto for the training of a pilot or bombardier in bombing techniques. The invention is also applicable to the testing of bomb sights.

All modern aircraft of the bombing type are equipped with precision bomsights and bomb release mechanisms and, to sight the target for an accurate hit the bombardier must know the air speed of the aircraft, which he may ascertain from an indicated air speed instrument, must know the velocity of the aircraft with respect to the target which he may measure with his bombsight, may wish to know the velocity and direction of the motion of the wind, which he may obtain from a suitable instrument, must know the altitude at which the aircraft is flying and must know the ballistic characteristics of the bombs which he is to release. From the air speed and wind velocity he can compute the ground speed of the aircraft. From this information he is able as the aircraft approaches the target area to inform the pilot, if necessary, as to the course which must be flown with respect to the target and is able to set his bombsight so that when the proper release point is reached the bomb may be dropped with the confidence that if he has made his observations and calculations correctly the bombs will strike within the target area.

Due to the technical complications involved in directing the flight course of the aircraft over the target area and the setting of the bombsight for the accurate bombing of the target, it is necessary to give bombardiers extensive and intensive practice. However, to avoid loss of time, the hazards and the expense of extensive training with actual service equipment, it is desirable that equipment may be available to enable the aircraft operating personnel, as far as practicable, to be taught on the ground to fly aircraft by instruments and to coordinate the flight with the techniques and requirements for bombing designated targets.

It is therefore the object of the present invention to indicate in an aircraft trainer the point on a map of the terrain over which a simulated flight is being conducted where a bomb when released in accordance with the calculations made and the setting of the bombsight would strike the ground thereby indicating to the bombardier the accuracy of his bombing.

The position of the bomb's impact is dependent primarily on the position of the aircraft above the ground at the time the bomb is released, the direction and velocity of the aircraft, the rate of change of the direction of flight, the direction and speed of the target and the velocity of the wind and the ballistics of the bomb. In order to indicate to the bombardier where a released bomb will strike, the trainer should be equipped to quantitatively determine these parameters. To obtain the position of the bomb burst, it is therefore necessary to add the movement of the bomb during its flight to the position which it has at the time of its release, that is, to the assumed position of the trainer on its simulated flight course.

Since a trainer is equipped with a course charting apparatus, it is possible to control potentiometers thereby which will produce potentials proportional to the instantaneous values of the $x$ and $y$ coordinates of the position of the trainer with respect to a reference point on the terrain map including the target area over which the simulated flight is being made. These potentiometers may therefore be employed to impress potentials on two summing amplifiers in accordance with the $x$ and $y$ coordinates of the position of the trainer at the time the simulated bomb release is made.

The degree and direction of movement of a bomb when released from an aircraft will depend upon several conditions but primarily upon the velocity at which the aircraft is flying and the altitude at which it is flying. The bomb preferably should be released when the flight course is fixed. If, however, the aircraft is changing its heading or deviating from level flight by climbing or diving, the degree and direction of movement of the bomb during its flight will be changed. It is a feature of the present invention to provide equipment associated with a trainer to derive potentials proportional to the coordinates of the flight path of the bomb as affected by the change in air speed and climbing and diving operations of simulated flight.

In accordance with this feature of the invention a sine-cosine potentiometer is provided, the sine and cosine brushes of which are driven by the means which controls the orientation of the driving head of the course charting apparatus of the trainer. The potentials derived by the brushes from the potentiometer windings are therefore proportional to the $x$ and $y$ coordinates of the potential applied to the windings and these potentials are applied to two summing amplifiers. The diametrically opposite points on the windings of the potentiometer are supplied with potential from the opposite ends of the secondary winding of a transformer of the push-pull type, the midpoint of the primary winding of which is supplied by potential attenuated by a potentiometer, the brush of which is driven by the altimeter shaft. The outer terminals of the primary winding of this transformer are connected to the anodes of two tubes, the control grid of one of which is supplied with a positive direct current potential generated by a generator driven by the air speed motor of the trainer and thus varies proportionally to the air speed of the simulated flight. The control grid of the other tube is supplied with negative potential generated by a generator driven by the altimeter motor. Since the transformer is a push-pull transformer, it will transmit energy to the sine-cosine potentiometer connected with its secondary winding only when the currents through its primary windings and through the tubes become unbalanced due to a change in air speed or due to a change in altitude incident to the simulation of climbing or diving.

A further feature of the invention is the provision of means associated with the trainer to derive potentials proportional to the coordinates of the flight path of the bomb as affected by the change of lateral deviation due to the operation of the trainer in simulation of steering.

In accordance with this feature, another sine-cosine potentiometer is provided, the sine and cosine brushes of which are also driven by the motor which controls the orientation of the driving head of the course chartering apparatus of the trainer. The potentials derived by the brushes from the windings of this potentiometer are therefore proportional to the $x$ and $y$ coordinates of the potential applied to the windings and these potentials are also applied to the summing amplifiers. The diametrically opposite points on the windings of this potentiometer are supplied with a potential from the secondary winding of another push-pull transformer, the mid-point of the primary winding of which is connected to a source of potential and the outer terminals of the primary winding of which are connected to the anodes of two tubes. The control grid of one of these tubes is connected to ground and the control grid of the other of these tubes is connected through a potentiometer the brush of which is driven by the altimeter shaft to a generator driven by the steering motor of the trainer. Since the transformer is of the push-pull type, it will transmit energy to the potentiometer connected with its secondary winding only when the currents through its primary windings and the tubes become unbalanced due to a change in the speed of the steering motor indicative of a change in the heading of the simulated flight.

A further feature of the invention is the provision of means to derive a potential for application to one summing amplifier indicative of the change in $y$ or lateral coordinate of the bomb flight resulting from the wind. For this purpose a potential is produced which is attenuated by a further potentiometer carried by the altimeter shaft, since the deviation will depend upon the altitude at which the simulated flight is being made, and further attenuated by a manually operable rheostat which may be adjusted in accordance with the wind velocity.

A further feature of the invention is the provision of means to utilize the summations of the potentials received by the two summing amplifiers and which summations should be accurate measures of the coordinates of the spot on the terrain map on which it is believed the bomb should strike, to operate an indicator to indicate such spot on the terrain map. For this purpose two servo-motors may be operated by the output potentials of the summing amplifiers to operate two coordinately positioned racks. These racks each carry an arm and the arms together support a lamp at their intersection. The motors are of the reversible type. For this purpose a two-phase motor may be used, one phase of each being energized by the supply source of alternating current and the other phase of which is energized by the output of one of the summing amplifiers. The motors rotate in the directions of the instant polarity of the amplifier output phases. Associated with each rack is a potentiometer the winding of which is stationary and the brush of which is carried by the rack. The brush of the potentiometer associated with the rack driven by the horizontal coordinate servo-motor is connected to the input side of the $x$ coordinate summing amplifier and the brush of the potentiometer associated with the rack driven by the vertical coordinate servo-motor is connected to the input side of the $y$ coordinate amplifier, and potentials opposite in polarity to the other input potentials applied to the amplifiers are supplied by such potentiometers until balances of the $x$ and $y$ amplifier inputs are secured, resulting in zero current to the motors.

The lamp is lighted over a timing circuit responsive to the operation of a key which simulates the bomb release key which the bombardier operates to release bombs when the bombsight indicates that the aircraft has reached a point where the bombs should be released to hit the target or responsive to the automatic closure of a contact in the bomb release mechanism. Since the time of fall of the bomb is dependent upon the altitude at which the aircraft is flying, the timing circuit, according to another feature of the invention, is arranged to introduce this altitude factor. For this purpose the contact when operated applies a direct current potential attenuated by a potentiometer whose brush is driven by the altimeter shaft, through a resistance to a condenser to ground and to the grid of a tube. After the time interval required to charge the condenser, which interval will be dependent upon the altitude at which the simulated flight is being made, the tube will become conducting to establish the circuit of the lamp. The flash from the lamp may be focused on the map at the point where the bomb should burst and an image of the map and light flash thereon may be projected upon a suitable screen in the trainer cabin.

For a clearer understanding of the invention, reference may be had to the following detailed description thereof taken in connection with the accompanying drawings in which.

Figure 1:
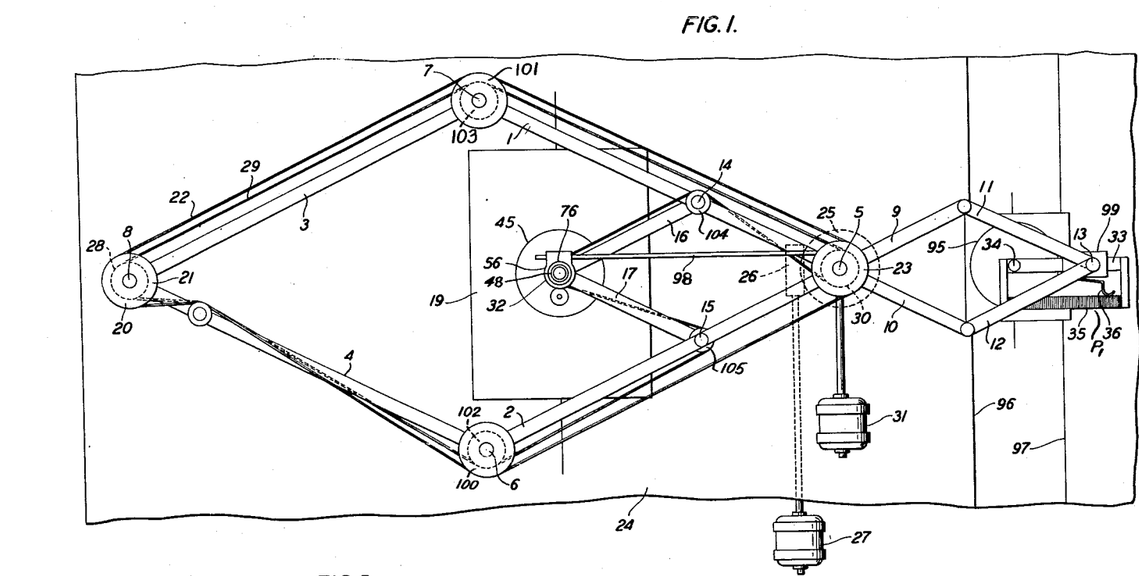
Fig. 1 shows the course charting apparatus of an aircraft trainer, modified to embody the present invention.
Figure 6:
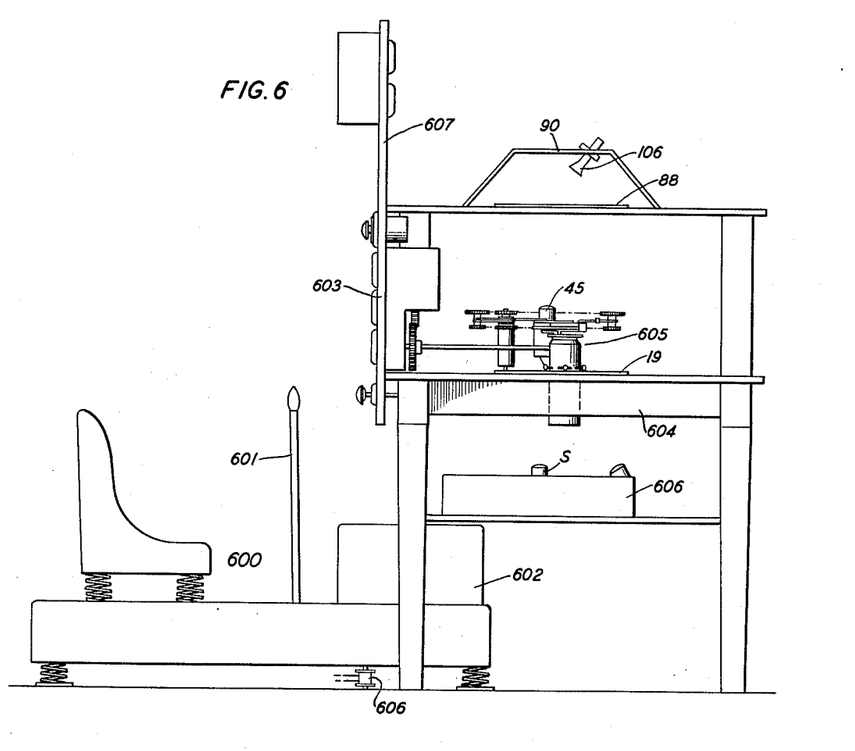
Fig. 6 is a side elevational view of a trainer equipped with the bombardier training apparatus in accordance with the present invention.

The invention is designed for use in a trainer of the type disclosed in my application Serial No. 398,590, filed June 18, 1941 and in my Patent No. 2,366,603, granted January 2, 1945. As disclosed more particularly in Fig. 6, the trainer comprises a pilot's station 600 provided with the usual control stick 601 and rudder pedals, which are hidden by the apparatus cabinet 602, and the instrument panel 603. The instrument panel is supported by the instructor's table 604 on which is positioned a course charting apparatus 605 movable over a terrain map 19. On a shelf beneath the table top, apparatus is mounted for throwing a spot of light on the terrain map to represent the spot where the burst of a simulated bomb would be. Mounted above the table is the bombardier's station with a bombsight 90 and an instrument panel 607 on which are mounted such instruments as the bombardier would require. This trainer is illustrated in Fig. 1 as having a course charting apparatus of the pantograph type. The main pantograph comprises four arms 1, 2, 3 and 4 pivoted together at their junctions by pivots 5, 6, 7 and 8. The arms 1 and 2 have short extensions 9 and 10 to the ends of which pantograph arms 11 and 12 are pivoted, the latter arms being pivoted together at their junction by a pin 13. Also pivoted to the arms 1 and 2 by pivots 14 and 15 are two additional pantograph arms 16 and 17 at the junction point of which is a terrain map projection unit 45, more fully disclosed in Fig. 2, for projecting an image of a terrain map over which a simulated flight is being conducted into the view of the bombardier who is being instructed in bombing technique and who is a member of the trainer crew.

At the junction point 8 is located a driving head 20 of the type fully disclosed in my application Serial No. 398,590 above referred to, having a tractor wheel (not shown) driven by the sprocket wheel 21 and through the sprocket chain 22 by the driving sprocket wheel 23 which is secured to the upper end of the pivot shaft 5. This shaft is mounted for rotation in a bearing secured to the table 24 located beneath the pulley 23 and therefore not visible in Fig. 1 and is driven by a worm gear 25 in turn driven by the worm 26 mounted on the shaft of the motor 27. To guide the chain 22 idler pulleys 100 and 101 are rotatably mounted on the pivots 6 and 7 of the pantograph.

The tractor wheel is mounted on a longitudinally disposed axle which is rotatably supported in the lower end of the driving head 20 which head is rotatable about its vertical axis to orient the tractor wheel in response to the operation of the trainer in the simulation of steering. To rotate the driving head sprocket wheel 28 is attached thereto as fully disclosed in my application Serial No. 398,590, hereinbefore referred to, which is driven by a sprocket chain 29 driven by a driving sprocket 30 mounted to rotate freely with respect to the pivot shaft 5 and in turn driven through bevel gearing by the steering motor 31 of the trainer. To guide the chain 29, idler pulleys 102, 103, 104 and 105 are rotatably mounted on the pivots 6, 7, 14 and 15 of the pantograph. The chain 29 also engages with the sprocket wheel 32 of the projection unit 45. Thus through the operation of motor 27, the driving head 20 is advanced over the surface of the table 24 at a speed proportional to the indicated air speed and is oriented to determine the direction of its movement under the control of motor 31, and, because of the pantograph construction, the projection unit 45 is moved proportionately over the terrain map 19. Also since the driving chain 29 which orients the driving head 20, also engages the sprocket wheel 32, the projection unit 45 is oriented in the same degree as the driving head.

The pivot pin 13 also moves through a path which corresponds to and is parallel to the flight course traced by the projection unit 45. For the purposes of the present invention, the movement of the pin 13 is employed to control potentiometers to determine potentials indicative of the degree and direction of the movement of the projection unit 45 with respect to the terrain map 19 and which potentials may be used to indicate the instantaneous position of the projection unit or the flight position of the trainer in its simulated flight with respect to a reference line assumed to be a line parallel to the lower edge of the map 19 as viewed in Fig. 1. To accomplish this the pivot pin 13 is engaged with a slider 99 which is supported on and slidable along the arm 33 secured to the shaft 34. Carried by the arm 33 is the potentiometer winding 35 with one edge of which the brush 36, insulatedly attached to the slider 99, engages. As the slider moves toward and away from the shaft 34 more or less of the turns of the potentiometer winding 35 are made effective.

Figure 4:
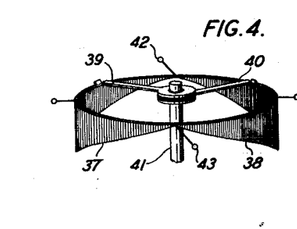
Fig. 4 shows the structure of the sine-cosine potentiometers illustrated schematically in Fig. 3.

Movement of the pin 13 about the shaft 5 also causes a rotational movement of the shaft 34. This rotational movement of shaft 34 is employed to control a potentiometer of the type disclosed in Fig. 4. This potentiometer has two windings 37 and 38 varying in resistance along their lengths in accordance with sinusoidal functions. The insulation is removed from the wire along the upper straight edge of the windings forming a contacting surface and two brushes 39 and 40 insulatedly mounted on the shaft 41 are provided for engagement therewith. The brushes are positioned 90 degrees apart and, with a potential applied across the terminals 42 and 43 at the junction points of the windings, the potential at the point of engagement of one brush with a winding will vary in accordance with the sine of the angle which that brush makes with the terminal position 42 and the potential at the point of engagement of the other brush with a winding will vary in accordance with the cosine of the angle.

Since the movement of the pantograph of the course charting apparatus is thus converted into a rotational movement of the shaft 34 and thus of the brushes of a sine-cosine potentiometer carried by said shaft and into a linear movement of the brush 36 with respect to the potentiometer winding 35, these potentiometers may be employed to determine the instant location of the projection unit 45 with respect to the $x$ and $y$ coordinates of the terrain map 19 and thus the position of the trainer in its simulated flight.

Figure 2:
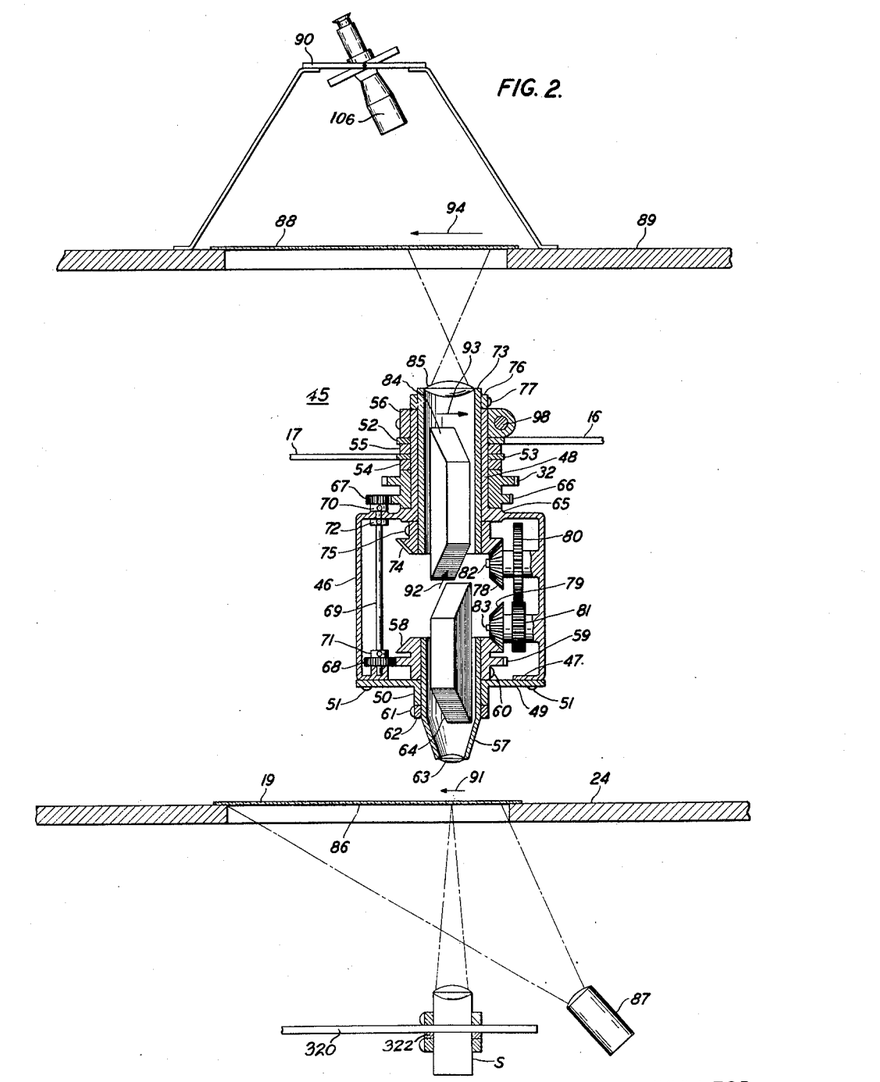
Fig. 2 shows equipment for projecting an image of a depicted objective over which a simulated flight is being conducted into the view of a bombardier student.

The projection unit 45, shown more in detail in Fig. 2, comprises a cylindrical casing 46 having an internal flange 47 on its lower edge and an axially disposed upwardly extending cylindrical portion 48. The lower end of the casing is closed by a plate 49 having an axially disposed and downwardly extending cylindrical portion 50. The plate 49 may be secured to the flange 47 of the casing 46 by suitable screws such as 51. Casing 46 is supported on the pantograph arms 16 and 17 terminating in annular collars 52 and 53 which surround the cylindrical portion 48 of the casing. The collared end of the pantograph arm 17 is spaced from the sprocket wheel 32 by a ring 54 and the annular portions 52 and 53 of the arms 16 and 17 are spaced by an interposed ring 55. For holding the sprocket wheel 32, pantograph arms 16 and 17, and spacing rings 54 and 55 in their assembled positions on the cylindrical portion 48 of the casing, a retaining collar 56 is provided which may be secured to the casing by a set screw. To prevent the rotation of the casing about its vertical axis the collar 56 is provided with an ear through which rod 98 secured to a collar rotatably mounted on shaft 5, slidably extends. The casing 46 of the projection unit 45 is thus supported at the junction point of the pantograph arms 16 and 17 and the portion 48 of the casing serves as a pivot at the junction of the ends of such arms.

Rotatably mounted in the downwardly extending cylindrical portion 50 of the end plate 49 of the casing 46 is a lens tube 57. To the upper end of this lens tube and within the casing 46 a bevel gear 58 having a spur gear 59 attached thereto or formed integrally therewith is secured by the screw 60. Secured to the lens tube just beneath the lower end of the portion 50 of the plate 49, as by a screw 61, is a collar 62. The gear 58 and collar 62 thus serve to prevent axial movement of the lens tube within the cylindrical portion 50 of the plate 49. Positioned within the lower end of the lens tube is an objective lens 63 and positioned in the upper end of the tube is an inverting prism 64. The lens tube 57 is rotatable with respect to the casing 46 by the sprocket wheel 32. For this purpose the sprocket wheel 32 is rotatably mounted on the cylindrical portion 48 of the casing 46 between the ring 54 and the shoulder 65 of the casing and has secured thereto or integrally formed therewith the spur gear 66. The spur gear 66 drives the spur gear 59 through the pinion gears 67 and 68 secured to the shaft 69. The shaft 69 is journaled in bearings in the upper end of the casing 46 and in the lower flange portion 47 of the casing and is held against axial movement by the collar 72 secured to the shaft. The spur gears 59 and 66 are of the same pitch diameter as are the pinion gears 66 and 67 and therefore the lens tube 57 is rotated to the same degree and in the same direction as the sprocket wheel 32, and therefore, since the sprocket wheel 32 is driven by the chain 29 which orients the driving head 20, the lens tube 57 is given the same azimuthal orientation as the driving head.

Rotatably mounted within the upper cylindrical portion 48 of the casing 46 is a second lens tube 73 having a bevel gear 74 secured to the lower end thereof within the casing 46 as by screw 75 and having a retaining collar 76 secured to the upper end thereof as by a screw 77. The lens tube while free to rotate with respect to the casing is thus held against axial movement. The gear 74 has the same pitch diameter as the gear 58 and such gears are interconnected by the bevel gears 78 and 79 and the spur gears 80 and 81. Gear 78 meshes with the bevel gear 74 and is integrally formed with spur gear 80, such gear assembly being mounted for rotation on a stud shaft 82 secured to the side wall of casing 46. Gear 79 meshes with the bevel gear 58 and is integrally formed with spur gear 81. Such gear assembly is mounted for rotation on a stud shaft 83 secured to the side wall of casing 46. Gear 80 meshes with gear 81 and has twice the pitch diameter of gear 81 and therefore the rotation of gear 58 and the lens tube 57 to which it is secured causes the rotation of gear 74 at one half the speed of gear 58 and in the same direction of rotation whereby the lens tube 73 is rotated in the same direction as the lens tube 57 but at half the speed thereof. The lens tube 73 is provided with an inverting prism 84 and a projection lens 85.

The projection unit 45 as disclosed in Figs. 1 and 2 is movable over a terrain map 19 which may be placed on a transparent plate 86 located over an opening in the table 24. The map may be brightly illuminated by a spotlight 87 located beneath the plate 86. Positioned above the projection unit 46 and in the alignment with the terrain map is a translucent screen 88. Preferably the screen should be located over an opening in the floor 89 of the cockpit of the trainer adjacent to the bombardier's seat in a position corresponding to the opening through which he would normally sight his bombsight. A bombsight 90 may be of any desired type but for the purpose of illustration is disclosed as a telescope 106 universally mounted on a suitable supporting stand to enable the bombardier to select any designated target area of the image of the terrain map 19 projected upon the screen 88 by the projection unit 45 for simulated bombing.

As the projection unit 45 is moved over the terrain map, the objective lens 63 scans different areas of the map and projects an image of the scanned area upon the screen 88. If the scanned area of the map be indicated by the arrow 91, then since the lens tube 57 and the prism 64 carried thereby are rotated by the sprocket wheel 32 and the gears 66, 67, 68 and 59, the prism 64 rotates the image 91 at twice the angular rotation of the driving head 20 which responds to the steering control of the trainer. Hence the object 91 may appear rotated as shown at 92. To reduce the rate of turning of the image to unity, with respect to the driving head 20, the prism 84 is driven as previously described at one half the rate but in the same direction as the prism 64 so that an image of the scanned area 91 appears as at 93. This image is then enlarged by the projection lens 85 and projected upon the screen 88 where it appears reversed from its position at 93 as indicated by the arrow 94.

The screen 88 as previously stated may be located in the floor of the cabin of the trainer and if it be assumed that the trainer is not movable, the screen has no rotation in azimuth to correspond to any steering control exercised by the student pilot. However, due to the arrangement of prisms 64 and 84 and their associated orienting and scanning means, the image 94 as viewed on the screen 88 will traverse and rotate in exactly the same manner in front of the bombardier as the earth would appear to move when looking down on it while flying a duplicate straight or varying course in an actual airplane. This precise and true movement of the image on the screen permits a bombardier to view the image with his bombsight 90 in the same manner that he would view the ground and thereby enables him to receive important and valuable training without the hazard and expense of actual flight. Moreover, if the map 19 is moved in the manner described in my application Serial No. 398,590 at a rate and direction equivalent to any desired wind drift, the trainee may view the image projected at 94 with his bombsight 90 or a wind drift indicator and thereby receive practice in navigation or bombing under wind conditions.

By observing the image 94 of the terrain map over which the simulated flight is being conducted, by observing the wind drift with a wind drift instrument in connection with the projected image, and from the observation of the other instruments of the trainer which give information necessary for accurate bombing, as for example, the air speed and the altitude at which the simulated flight is being conducted, the bombardier may set his bombsight 90 with respect to the projected image 94 for bombing a target area of the projected image specified by the instructor. If the bombardier has made his calculations correctly and has set his bombsight accurately in accordance therewith, then when the simulated flight reaches the chosen point as determined by the setting of the bombsight, the operation of the bomb release contact to simulate the releasing of a bomb should, in accordance with the present invention, be effective to indicate a hit on the selected target area.

As previously stated in actual bombing practice, the position of the bomb impact is primarily dependent on (a) the position of the airplane above the ground at the time the bomb is released; (b) the direction and velocity of the airplane; (c) the rate of change of the direction of flight; (d) the direction and velocity of the wind and (e) the ballistics of the bomb.

Figure 3:
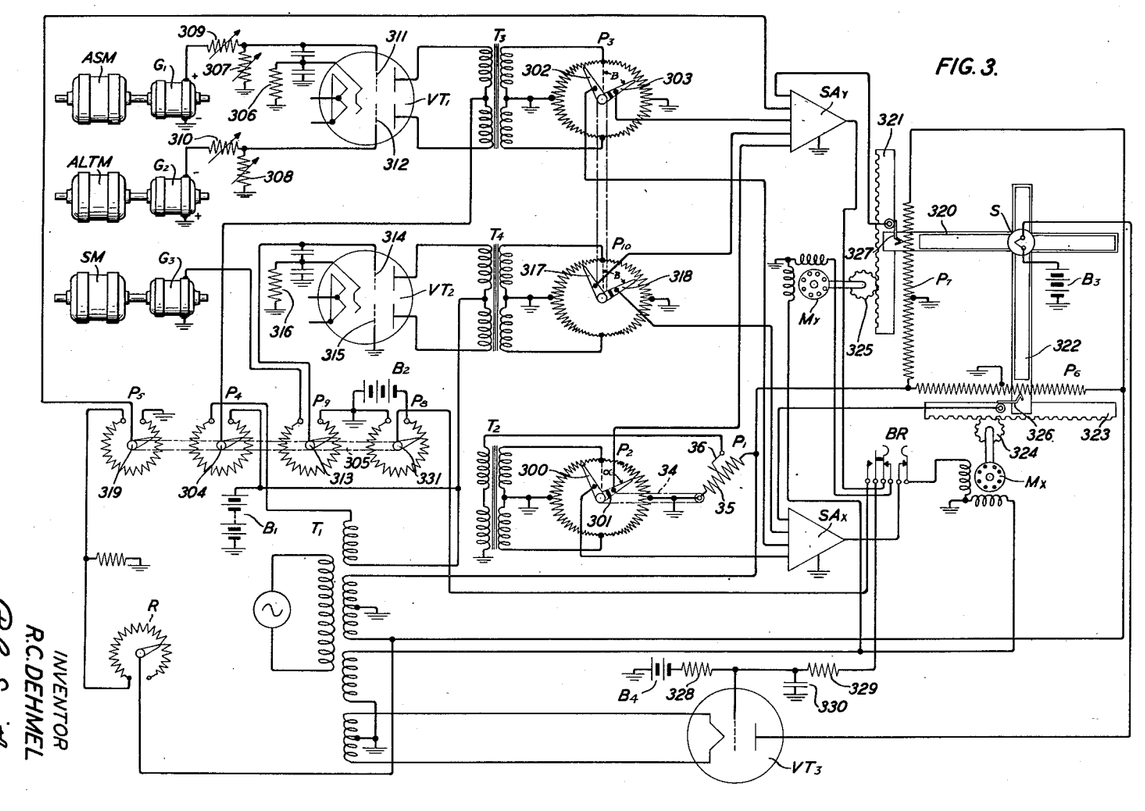
Fig. 3 is a circuit diagram illustrating the application of the invention to a trainer.

These parameters may be determined quantitatively in the trainer through the use of the circuit disclosed in Fig. 3. The first of the above-mentioned parameters, that is the position of the airplane above the ground at the time the bomb is released may be ascertained in the trainer by the potentiometers disclosed in Fig. 1 as controlled by the operation of the course charting apparatus.

These potentiometers are indicated at P1 and P2 in Fig. 3. The winding 35 of potentiometer P1 corresponds to the similarly designated winding of Fig. 1 and is supplied with potential from a secondary winding of transformer T1, the primary winding of which is connected to a source of alternating current. The brush 36 of this potentiometer is connected to the primary winding of transformer T2 and the end terminals of the secondary winding of the latter transformer are connected to the junction points between the windings of the sine-cosine potentiometer P2. The mid-point of the secondary winding of transformer T2 and the mid-points of the windings of potentiometer P2 are connected to ground. With the windings of transformer T2 wound for unity transformation, the potential $r$ derived by the position of brush 36 of potentiometer P1 is applied to produce potentials of equal magnitude and opposite polarity at the junction points of the windings of potentiometer P2 for exciting such windings. It is to be noted that the position of brush 36 of potentiometer P1 and the angle $\alpha$ between the brush 301 of potentiometer P2 and the $y$ axis of such potentiometer, determine the flight position of the trainer with respect to the horizontal plotting surface of the terrain map 19.

Since the potentiometer P1 produces a potential $r$ proportional to the radial distance of the slider brush 36 from the shaft 34 and the potential is fractionated by the sine-cosine potentiometer P2, in accordance with the angular position $\alpha$ of the arm 33 carrying the potentiometer P1, the potentials resulting at the points of engagement of the brushes 300 and 301 of the potentiometer P2 with the windings thereof are proportional to the $x$ and $y$ coordinates of the flight position of the trainer and may be expressed as the potential values $$x = r \sin \alpha$$
$$y = r \cos \alpha \quad (1)$$

the altitude $h$ is, of course, the altimeter reading.

The second of the parameters (b) is the direction and velocity of the airplane. As above explained, the direction of the flight simulated by the trainer is determined in response to steering by the orientation of the driving head 20 through the operation of the steering motor 31 and the velocity $v$ of the simulated flight in a horizontal direction is proportional to the speed at which the driving head 20 is driven by the air speed motor 21. Hence, if the heading of the trainer with respect to the $y$ axis, assumed to be through the shaft 34 and extending horizontally as viewed in Fig. 1, be assumed to be $\beta$ then the ground velocities with respect to the $x$ and $y$ coordinates are $$v_x = v \sin \beta$$
$$v_y = v \cos \beta \quad (2)$$

The velocity of the simulated flight in a vertical direction is equal to the reading of the vertical air speed indicator or rate of climb instrument of the trainer, which instrument is driven by the altimeter motor of the trainer. Accordingly, $v_h$ equals rate of climb.

The third of the parameters (c) is the rate of change of direction of the airplane. In the trainer the rate of change of horizontal direction $\omega$ is proportional to the speed of the steering motor 21 as described in my patent application Serial No. 398,590, hereinbefore referred to. In actual flight this rate of change of horizontal direction introduces a component of acceleration to the bomb so as to deflect it laterally from the normal flight path.

In my application Serial No. 398,590, I have described in detail the manner in which the signal controller may be oriented and translated to introduce the effect of wind drift. This may be accomplished in a trainer embodying the present invention in the same manner by mounting the controller including the potentiometers P1 and P2 on a support 95 as disclosed in Fig. 1 which may be moved along the runway 96 and 97 on the table 24. A terrain map 19 used for projecting the ground image into the trainer would be similarly displaced. The angle through which the controller and map are oriented is the azimuth angle of the wind $\theta$ and the rate at which they are translated is proportional to the velocity of the wind W. If the reference direction referred to in the preceding paragraph is taken along this same azimuth angle $\theta$ then the components of the wind velocity along the $x$ and $y$ axes are $$W_x = W \sin (\theta + 180°) = 0$$
$$W_y = W \cos (\theta + 180°) = -W \quad (3)$$

The trajectory of the bomb is expressed in rates along the $x$, $y$ and $h$ coordinates varying with changes in the parameters above discussed. For any given speed of the airplane in level flight, the distance that the bomb strikes the ground beyond the point of release is primarily a function of altitude and wind velocity. Most bombsights in use at present require that the airplane be flown in straight and level flight and at constant speed while sighting the target and releasing the bomb.

For determining the point of impact of the bomb on the ground the circuit of Fig. 3 is provided for the trainer whereby the flight parameters just discussed are continuously impressed on such circuit which is designed to constantly compute the impact position of the bomb in terms of the Cartesian coordinates $x$ and $y$ and to also compute the time required for the bomb to fall to the ground.

If $x$ and $y$ are the coordinates of the flight position at which the assumed bomb release is to be made, the computed position of its impact is $$x_p = x + \Delta x$$
$$y_p = y + \Delta y \quad (4)$$

where $\Delta x$ and $\Delta y$ are the horizontal distances traveled by the bomb during its flight to the ground.

These distances depend upon the average horizontal velocity of the bomb and on the time it is in flight and therefore $$\Delta x = \bar{v}_x t$$
$$\Delta y = \bar{v}_y t \quad (5)$$

where $\bar{v}_x$ and $\bar{v}_y$ are the coordinate values of the average velocity and $t$ is the time of flight.

Since the time of flight $t$ is a function of the altitude and velocity of the bomb when released $$t = f_1(h) f_2(v) \quad (6)$$

However, for the level flight $f_2(v)$ is very small and if this is neglected then $$t = f_1(h) \quad (7)$$

Combining Equations 5 and 7

$$\Delta x = \bar{v}_x f_1(h)$$
$$\Delta y = \bar{v}_y f_1(h) \quad (8)$$

The average velocities $\bar{v}_x$ and $\bar{v}_y$ are dependent on the initial velocities $v_x$ and $v_y$ and the time of flight. Therefore $$\bar{v}_x = F(v_x t)$$
$$\bar{v}_y = F(v_y t)$$

However, the variation with $v_x$ and $v_y$ is small, hence $$\bar{v}_x = v_x f_3[t] = v_x f_3[f_1(h)] = v_x f_4(h)$$
$$\bar{v}_y = v_y f_3[t] = v_y f_3[f_1(h)] = v_y f_4(h) \quad (9)$$

Combining Equations 8 and 9

$$\Delta x = v_x f_4(h) f_1(h) = v_x f_5(h)$$
$$\Delta y = v_y f_4(h) f_1(h) = v_y f_5(h) \quad (10)$$

Substituting Equation 10 in Equation 4

$$x_p = x + v_x f_5(h)$$
$$y_p = y + v_y f_5(h) \quad (11)$$

Referring now to Equations 1 and 2 Equation 11 may now be written $$x_p = r \sin \alpha + f_5(h) \, v \sin \beta$$
$$y_p = r \cos \alpha + f_5(h) \, v \cos \beta \quad (12)$$

Since the $y$ axis of the Cartesian coordinates is chosen along the $\alpha = 0$ direction which is the direction from which the wind is blowing the effect of wind drift will be to add a negative component $-\delta_1 y$ along the $y$ axis or $$y_p = y + \Delta y - \delta_1 y \quad (13)$$

The bomb displacement $\delta_1 y$ due to the wind is directly dependent on the wind velocity $W$ along the $y$ axis and it is a function of the time of flight, therefore $$y_p = y + \Delta y - f_6[f_1(h)] W = y + \Delta y - f_7(h) W \quad (14)$$

or $$y_p = r \cos \alpha + f_5(h) \, v \cos \beta - f_7(h) W \quad (15)$$

The computed positions $x_p$ and $y_p$ are further modified by any climb or dive rate of the airplane at the time of the bomb release due to its effect on the time of flight. These additional increments are $$\delta_2 x = f_8(v_h) f_9[t] \sin \beta = f_8(v_h) f_{10}(h) \sin \beta$$
$$\delta_2 y = f_8(v_h) f_9[t] \cos \beta = f_8(v_h) f_{10}(h) \cos \beta \quad (16)$$

where $v_h$ is the vertical air speed as indicated by the rate of climb instrument.

Another factor affecting bomb impact computation is lateral deviation from straight line flight caused by turning the airplane. The effect of a rate of turn $\omega$ on the computed impact coordinate is dependent on the altitude and is given by the equations $$\delta_3 x = -\omega f_{11}(h) \cos \beta$$
$$\delta_3 y = -\omega f_{11}(h) \sin \beta \quad (17)$$

Adding Equations 12, 16 and 17 the following equations are secured $$x_p = r \sin \alpha + [f_5(h) \, v + f_8(v_h) f_{10}(h)] \sin \beta - \omega f_{11}(h) \cos \beta$$
$$y_p = r \cos \alpha + [f_5(h) \, v + f_8(v_h) f_{10}(h)] \cos \beta - \omega f_{11}(h) \sin \beta - W f_7(h) \quad (18)$$

and the time of flight $t$ is $$t = f_1(h) + f_{12}(v_h) \quad (19)$$

where $f_{12}(v_h)$ is the effect of the vertical air speed on the time $t$.

The parameters in each of the foregoing equations may be expressed as potentials or as circuit constants and the mathematical operations can be performed by an electrical circuit as will now be described. The novel and important features of the invention are the method and means in the trainer for obtaining the various position and velocity values required in the production of Equations 18 and 19 and the method and means of converting these parameters into electrical potentials and circuit constants and combining them in an electrical circuit to indicate the position of the burst of a bomb.

To obtain the computed position of the bomb burst it is only necessary to add the movement of the bomb during its flight following its release, to its instant position which is the point of release or the location of the trainer in its simulated flight. This addition is performed in the component summing amplifiers $SAx$ and $SAy$ disclosed in Fig. 3. It has heretofore been described how potentials may be derived from the operation of the potentiometers P1 and P2 in response to the operation of the trainer in its simulated flight. It will be recalled that the output potentials from the potentiometer P2 as indicated in Equation 1 are $x = r \sin \alpha$ and $y = r \cos \alpha$. These potentials are the first components in Equation 18 and are applied to the input sides of the amplifiers $SAx$ and $SAy$, respectively.

Figure 5:
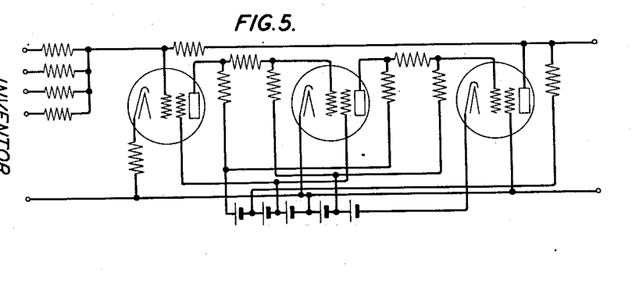
Fig. 5 shows one form of summing amplifier circuit which may be employed in the circuit of Fig. 3.

These summing amplifiers may be of the type disclosed in Fig. 5 but since amplifiers of this type are known in the art a detailed description thereof herein is not deemed to be necessary.

The second components of Equation 18, namely, $f_5(h) \, v \sin \beta$ and $f_5(h) \, v \cos \beta$ are secured from a second sine-cosine potentiometer P3 which is constructed in the same manner as potentiometer P2. Brushes 302 and 303 of potentiometer P3 are driven in accordance with the azimuth angle $\beta$ of the course charting head 20 and the projection device 45 in response to the simulated steering of the trainer, brush 303 being at the upper junction point between the two windings of the potentiometer when the angle $\beta = 0$. The diametrically opposite junction points between the windings of the potentiometer are connected to the end terminals of the secondary winding of transformer T3, the mid-point of the secondary winding of this transformer and the mid-points of the windings of the potentiometer being connected to ground. Potentials impressed upon the windings of the potentiometer from the transformer T3 are therefore of equal magnitude but of opposite polarity.

The mid-point of the primary winding of transformer T3 is connected to the brush 304 of the potentiometer P4, the winding of which is bridged across the upper secondary winding of transformer T1 and one end of which winding is connected to the positive or ungrounded terminal of anode battery B1. Potential supplied from the upper secondary winding of transformer T1 is thus attenuated by the potentiometer P4 and applied to the mid-point of the primary winding of transformer T3. The brush 304 of potentiometer P4 is mounted on the shaft 305 which drives the altimeter of the trainer. The resistance card of the potentiometer P4 is contoured so that the potential at its brush 304 is modified according to the function $f_5(h)$ appearing in Equation 11.

The end terminals of the primary winding of transformer T3 are connected to the anodes of the dual triode tube VT1, the cathodes of which are connected to ground through resistance 306, the filaments of which are heated by current supplied over any suitable circuit as, for example, over the lowermost secondary winding of transformer T1 and the grids of which are connected to ground through the resistances 307 and 308 and also to ground through resistances 309 and 310 and the direct current generators G1 and G2. The anodes of tube VT1 are supplied with anode potential from the battery B1 through the primary windings of transformer T3 and through the potentiometer P4. The primary windings of transformer T3 are wired in push-pull relationship to each other so that the alternating current potential from the upper secondary winding of transformer T1 and attenuated by the potentiometer P4, induces no potential into the secondary winding of transformer T3 unless the cathode-anode circuits through the tube VT1 become unbalanced. If the grid 311 is swung away from its normal biasing potential by a potential corresponding to the velocity $v$ of the simulated flight, the potential applied to the windings of potentiometer P3 will be proportional to the potential $v$. To obtain the potential $v$ representing the flight speed a generator G1 is driven by the air speed motor ASM of the trainer. The resistances 307 and 309 provide means for adjusting the scale position of the potential $v$. This potential $v$ determines the space current flowing through the upper primary winding of transformer T3 as modified by the potential $f_5(h)$ derived by the potentiometer P4 so that the potential applied to the windings of potentiometer P3 produces the potential $vf_5(h)$ which is resolved by the potentiometer P3 into the components of Equation 11 $v_x f_5(h)$ and $v_y f_5(h)$. These components are then applied by the brushes 302 and 303 of the potentiometer as components $f_5(h) v \sin \beta$ and $f_5(h) v \cos \beta$ of Equation 18 to the summing amplifiers SA$x$ and SA$y$.

The calculated position of the bomb burst is also modified by any vertical movement of the airplane. Inasmuch as most bombsights now in use are designed for bombing during level flight, it is not essential in a trainer that the burst position be accurately determined when a vertical air speed component is present. Accordingly, a simple circuit arrangement which approximates the effect of vertical air speed is adequate. For low rates of climb the calculated position is advanced due to the longer time of flight of the bomb whereas for low rates of dive the position is brought closer to the point of release. If a generator G2 driven by the motor ALTM which drives the altimeter is connected to the grid 312 of tube VT1 with the proper polarity, a climb will cause the grid to be polarized to aid the effect of grid 311 and to increase the calculated distance to the burst. However, if the motor ALTM drives the generator G2 to generate a potential of opposite or dive polarity the resultant potential impressed upon potentiometer T3 will decrease and the calculated flight distance will be shorter. The resistances 306 and 308 may be varied to adjust the scale factor $v_h$ with respect to $v$.

The effect of turning on the calculated bomb burst is to cause a lateral deviation from the desired impact point as given by Equation 17. The potential $-(\omega)$ is obtained from a generator G3 which is driven by the steering motor SM of the trainer. This motor rotates at a speed proportionate to the rate of turn. The potential $-(\omega)$ from the generator G3 is attenuated in the potentiometer P9 whose brush 313 is driven by the altimeter shaft 305 and whose card is contoured so that the attenuation is in accordance with the function $f_{11}(h)$ of Equation 17 and this attenuated potential is applied as a bias to the grid 314 of the dual triode tube VT2. The other grid 315 of this tube is connected to ground, the cathodes are connected to ground through resistance 316 and the anodes are connected to the end terminals of the primary winding of transformer T4. The filaments of this tube may be heated if desired by current applied from the lower secondary winding of transformer T1. The mid-point between the primary winding of transformer T4 is connected to the positive or ungrounded terminal of anode battery B1 whereby anode potential is supplied to the tube VT2.

The end terminals of the secondary winding of transformer T4 are connected to the junction points between the windings of sine-cosine potentiometer P10, the brushes 317 and 318 of which are mounted on the same shaft as the brushes of potentiometer P3. The cosine brush 318 is at the upper junction point between the potentiometer windings when the angle $\beta$ is equal to 0. The mid-point of the secondary winding of transformer T4 and the mid-points of the windings of potentiometer P10 are grounded. The transformer T4 therefore applies potentials of equal magnitude and of opposite polarity to the junction points between the windings of potentiometer P10 which are equal to $\pm[-\omega f_{11}(h)]$ and these potentials are fractionated by the potentiometer P10 and applied to the input side of the summing amplifiers SA$x$ and SA$y$ as potentials $-\omega f_{11}(h) \sin \beta$ and $-\omega f_{11}(h) \cos \beta$. It will be noted that these potentials appear as the third components of the Equation 18.

The effect of wind on the calculated burst position of the bomb is the factor $-f_7(h)W$ shown in Equation 14. A potential W obtained from the next to upper secondary winding of transformer T1 is applied through a rheostat R adjustable in accordance with the wind velocity and through the potentiometer P5 to the input side of the amplifier SA$y$. The brush 319 of potentiometer P5 is driven by the altimeter shaft 305 and the resistance card is contoured to modify the potential W in correspondence with the function $f_7(h)$ and to thereby produce a voltage at the brush of the potentiometer equal to $-Wf_7(h)$. This potential appears as the last component of the $y$ coordinate, Equation 18.

The summing amplifiers $SAx$ and $SAy$ have now received the instant values of the potentials which determine the $x$ and $y$ coordinates of the instant flight position of the trainer and the $x$ and $y$ components of the calculated flight of the bomb following its release, and the additions of such potentials now appear at the outputs of the amplifiers to give the $x_p$ and $y_p$ positions of the burst of the bomb. The output potentials $x_p$ and $y_p$ may be read on voltmeters. Preferably, however, it is desirable to utilize these output potentials to position an indicator with respect to the terrain map over which the flight is being conducted to indicate the exact position of the bomb burst.

To accomplish this a spotlight S is positioned beneath the table 24 as disclosed in Fig. 2 which may be oriented with respect to the terrain map 19 and lighted to focus a spot of light of greater intensity than the general illumination of the map by the spotlight 87. The spotlight S is supported at the junction point of a horizontal arm 320 and the vertical arm 322. The arms 320 and 322 are secured at right angles to the centers of a vertical rack 321 and a horizontal rack 323, respectively. The horizontal rack 323 is movable by a pinion 324 rotatable either directly or through reduction gearing by the two-phase servo-motor $Mx$ and the vertical rack 321 is movable by a pinion 325 rotatable either directly or through reduction gearing by the two-phase servo-motor $My$.

One phase winding of each of the motors is energized by alternating current supplied thereto over the next to lower secondary winding of transformer T1. The other phase winding of motor $Mx$ is energized by the output potential from the summing amplifier $SAx$ over a circuit extending over the right normal contacts of the bomb release key BR and the other phase winding of motor $My$ is energized by the output potential from the summing amplifier $SAy$ over a circuit extending over the middle normal contacts of key BR. Whenever output potentials are present at the amplifiers the motors will operate in the direction of the instant polarity of the amplifier output phases.

As the motor $Mx$ rotates it moves rack 323 and brush 326 carried thereby of potentiometer P6 over the winding of such potentiometer and as motor $My$ rotates it moves rack 321 and brush 327 carried thereby of potentiometer P7 over the winding of such potentiometer. The windings of these potentiometers are bridged across the terminals of the next to upper secondary winding of transformer T1 and therefore receive energy therefrom. The potential distribution along the potentiometers P6 and P7 is the same as the net of the input potentials to the amplifiers $SAx$ and $SAy$ for any value of $x_p$ or $y_p$ except that the sign of the potentials from the potentiometers is reversed. The brushes 326 and 327 are connected back to the input sides of the amplifiers so that when the racks 323 and 321 have been positioned to the values of $x_p$ and $y_p$ the potentials from the brushes 326 and 327 are equal and opposite to the net input potential at each amplifier and this balance results in zero amplifier current to the motors $Mx$ and $My$. However, should the input potential to either amplifier change, the associated motor will receive current and operate until the rack is again moved to a position of balance. Hence the motors $Mx$ and $My$ continuously function to move the racks to the calculated positions and in so doing move the spotlight S to the position having the calculated $x_p$ and $y_p$ coordinates.

The amplifiers $SAx$ and $SAy$ when used for operating two-phase servo-motors in this manner should preferably have high gain characteristics and output current limiting circuits so that the motors receive substantially full power with a limited displacement from the balance point and yet are not overloaded at large displacements.

As an alternative means for moving the spotlight S the output potentials from the amplifiers could move the light by the mechanism known commercially as the telautograph.

The spotlight S is flashed by the time of flight circuit after the calculated interval $t$ has elapsed subsequent to the release of the bomb simulated by the operation of the bomb release key BR. According to Equation 19 this time $t$ equals $f_1(h) + f_{12}(v_h)$. To measure this time a tube VT3 is employed, the anode of which is supplied with potential from the anode battery B3 through the lamp of the spotlight S and the grid of which is biased by current applied thereto from the negative biasing battery B4 through the resistance 328 and the filament of which is heated by current supplied from the lower secondary winding of transformer T1. The tube VT3 which may preferably be of the thyratron or gas-filled type is so adjusted as to pass insufficient anode current to light spotlight S. The grid of the tube is also connected to resistance 329 and to one terminal of condenser 330, the other terminal of which is grounded. When the bomb release key BR is operated at the instant when the image of the target appears at the cross-hair intersection point of the bombsight 90, previously adjusted in accordance with the calculations which have been made for securing a hit on the target, potential is applied from the battery B2, attenuated by the potentiometer P8 through resistance 329, to the grid of tube VT3. The value of this potential will vary in accordance with the altitude at which the flight course is being flown by the setting of brush 331 of potentiometer P8 by the altimeter shaft, the card of the potentiometer being contoured so that a given rise of potential is obtained at the condenser 330 at an interval corresponding to $t$ seconds after the closure of the bomb release key. After the interval $t$ seconds required to charge the condenser 330 from the source B2, the potential on the grid of tube VT3 will be sufficient to cause the tube to pass sufficient anode current to cause the spotlight S to flash and throw a spot of light on the location on the terrain map at which a bomb should actually burst. This spot of light appearing on the terrain map is projected with the image of the target area upon the screen 88 where it may be observed by the bombardier student to enable him to check the accuracy of the bomb burst.

The bomb release key BR when operated also disconnects the output sides of the summing amplifiers $SAx$ and $SAy$ from phase windings of the motors $Mx$ and $My$ so that the position of the spotlight S will not change following the operation of the key until the spotlight flashes and the circuit has been restored to make a further calculation.

The map 19 could depict any desired objective to be bombed such as an aircraft or if desired an image of an aircraft could be superimposed on the map 19 and moved with respect thereto by any suitable means to enable training in the bombing of other aircraft to be given.

What is claimed is:

1. In an aircraft trainer, a means for producing the image of a target to be bombed, means under the control of a trainee for operating the trainer in simulation of flight over the target image, means operative to simulate the setting of a bombsight to bomb the target image, an indicator, and means controlled in the operation of said trainer in simulation of flight to the bombing position over the target image determined by the setting of the bombsight for positioning said indicator to indicate the position where a released bomb would actually burst with respect to said target image.

2. In an aircraft trainer, a terrain map, means under the control of a trainee for operating the trainer in simulation of flight over the terrain depicted by said map, means operative to simulate the setting of a bombsight to bomb a specified target area of said terrain, an indicating lamp, means controlled in the operation of said trainer in simulation of flight to the bombing position over the target area determined by the setting of the bombsight for positioning said indicating lamp to indicate the position where a bomb would actually burst on said terrain, and means controlled by said trainee for lighting said lamp after a timing interval simulating the time which would be required for a bomb to reach the target area following the release of the bomb.

3. In an aircraft trainer, a terrain map, means under the control of a trainee for operating the trainer in simulation of flight over the terrain depicted by said map, means operative to simulate the setting of a bombsight to bomb a specified target area of said terrain, an indicating lamp, means controlled in the operation of said trainer in simulation of flight to the bombing position over the target area selected for simulated bombing by the setting of the bombsight for positioning said indicating lamp to indicate the position where a bomb should actually burst on said terrain, a key operable to simulate the release of a bomb and a condenser timed electronic means operable at an interval following the operation of said key predetermined to simulate the time which would be required for a released bomb to reach the target area for causing the lighting of said lamp.

4. In an aircraft trainer, a terrain map, means under the control of a trainee for operating the trainer in simulation of flight over the terrain depicted by said map, means operative to simulate the setting of a bombsight to bomb a specified target area of said terrain, an indicating lamp, means controlled in the operation of said trainer in simulation of flight to the bombing position over the target area selected for simulated bombing by the setting of the bombsight for positioning said indicating lamp to indicate the position where a bomb should actually burst on said terrain, a key operable to simulate the release of a bomb, a condenser timed electronic means operable at an interval following the operation of said key for causing the lighting of said lamp, and means for varying the delay interval measured by said electronic means in accordance with the altitude at which the simulated flight is being made to simulate the time which would be required for a bomb released at different altitudes to reach the target area.

5. In an aircraft trainer, a terrain map, means under the control of a trainee for operating the trainer in simulation of flight over the terrain depicted by said map, means operative to simulate the setting of a bombsight to bomb a specified target area of said terrain, an indicating lamp, means controlled in the operation of said trainer in simulation of flight to the bombing position over the target area determined by the setting of the bombsight for positioning said indicating lamp to indicate the position where a bomb should actually burst on said terrain, a key operable to simulate the release of a bomb, a condenser timed electronic means operable at an interval following the operation of said key for causing the lighting of said lamp, an altimeter shaft rotatable into a position representative of the altitude at which the simulated flight is being made, and a potentiometer operated by said altimeter driving shaft for varying the delay interval measured by said electronic means in accordance with the altitude to simulate the time which would be required for a bomb released at different altitudes to reach the target area.

6. In an aircraft trainer, a terrain map, means under the control of a trainee for operating the trainer in simulation of flight over the terrain depicted by said map, and means for indicating on said map the position at which a bomb would appear to burst if the simulated release of a bomb were made at any instant during said simulated flight, said means comprising a lamp and means for moving said lamp in accordance with the instant values of the rectangular coordinates of the simulated changing position of the trainer in its simulated flight as modified by the instant indications of assumed wind drift, air speed, altitude and vertical and horizontal deviations from the straight level flight required for the simulated bombing of a specified target area on said map.

7. In an aircraft trainer, a terrain map, means under the control of a trainee for operating the trainer in simulation of flight over the terrain depicted by said map, means for determining the instant values of the coordinates of the simulated changing position of the trainer in its simulated flight, means for simulating the release of a bomb to hit a selected target on said map, means for determining the values of the coordinates of the bomb flight, means for combining said coordinates and resolving the results into potentials representative of the position where a released bomb would actually burst on said terrain, and indicating means controlled by said potentials for indicating said bomb burst location on said map.

8. In an aircraft trainer, a terrain map, means under the control of a trainee for operating the trainer in simulation of flight over the terrain depicted by said map, means for determining the instant values of the coordinates of the simulated changing position of the trainer in its simulated flight, means for simulating the release of a bomb to hit a selected target on said map, means for determining the instant values of the coordinates of the bomb flight as modified by the instant values of the air speed, the altitude, and the rate of change of altitude incident to climbing or diving of the simulated flight, means for combining said coordinates and resolving the results into potentials representative of the position where a released bomb would actually burst on said terrain, and indicating means controlled by said potentials for indicating said bomb burst location on said map.

9. In an aircraft trainer, a terrain map, means under the control of a trainee for operating the trainer in simulation of flight over the terrain depicted by said map, means for determining potentials proportional to the instant values of the $x$ and $y$ coordinates of the simulated changing position of the trainer in its simulated flight, means for simulating the release of a bomb to hit a selected target on said map, means for determining potentials proportional to the instant values of the $x$ and $y$ coordinates of the bomb flight as modified by the instant values of the air speed, the altitude, and the rate of change of altitude incident to climbing or diving of the simulated flight, amplifiers for summing the corresponding coordinate potentials, an indicator, bars movable in coordinate directions for positioning said indicator, and motors controlled by the output potentials of said amplifiers for operating said bars whereby said indicator is positioned to indicate the spot on said map where a released bomb would actually burst.

10. In an aircraft trainer, a terrain map, means under the control of a trainee for operating the trainer in simulation of flight over the terrain depicted by said map, means for determining potentials proportional to the instant values of the $x$ and $y$ coordinates of the simulated changing position of the trainer in its simulated flight, means for simulating the release of a bomb to hit a selected target on said map, means for determining potentials proportional to the instant values of the $x$ and $y$ coordinates of the bomb flight as modified by the instant values of the air speed, the altitude, and the rate of change of altitude incident to climbing or diving during the simulated flight, means for determining potentials proportional to the instant values of the $x$ and $y$ coordinates of the bomb flight as modified by the instant values of the altitude and the rate of change of bearing incident to the simulation of steering, amplifiers for summing the corresponding coordinate potentials and for producing potentials representative of the coordinates of the position where a released bomb would actually burst on said terrain, and indicating means controlled by the output potentials from said amplifiers for indicating said bomb burst location on said map.

11. In an aircraft trainer, a terrain map, means under the control of a trainee for operating the trainer in simulation of flight over the terrain depicted by said map, means for determining potentials proportional to the instant values of the $x$ and $y$ coordinates of the simulated changing position of the trainer in its simulated flight, means for simulating the release of a bomb to hit a selected target on said map, means for determining potentials proportional to the instant values of the $x$ and $y$ coordinates of the bomb flight as modified by the instant values of the air speed, the altitude, and the rate of change of altitude incident to climbing or diving during the simulated flight, means for determining potentials proportional to the instant values of the $x$ and $y$ coordinates of the bomb flight as modified by the instant values of the altitude and the rate of change of bearing incident to the simulation of steering, means operable to represent the estimated wind velocity, means for determining a potential proportional to the instant value of the lateral deviation of the bomb in its flight as modified by the altitude at which the simulated flight is made and the estimated velocity of the wind, amplifiers for summing the corresponding coordinate potentials and for producing potentials representative of the coordinates of the position where a released bomb would actually burst on said terrain, and indicating means controlled by the output potentials from said amplifiers for indicating said bomb burst location on said map.

12. In an aircraft trainer, a terrain map, means under the control of a trainee for operating the trainer in simulation of flight over the terrain depicted by said map, means in said trainer for charting the course of the simulated flight, means operable by said charting means for determining potentials the instant values of which are proportional to the $x$ and $y$ coordinates of the instant charter position of the trainer, means for simulating the release of a bomb to hit a selected target on said map, means for determining potentials the instant values of which are proportional to the $x$ and $y$ coordinates of the bomb flight, means for combining the corresponding coordinate potentials and for producing potentials representative of the coordinates of the position where a released bomb would actually burst on said terrain, and indicating means controlled by said latter potentials for indicating said bomb burst location on said map.

13. In an aircraft trainer having motors operated in accordance with the air speed and altitude of a simulated flight, a terrain map, means under the control of a trainee for operating the trainer in simulation of flight over said terrain map, means for simulating the release of a bomb, means for determining potentials proportional to the $x$ and $y$ coordinates of the bomb flight comprising a sine-cosine potentiometer, means for operating the brushes of said potentiometer in accordance with the orientation of the trainer in its simulated flight, two electronic devices, a transformer having its secondary winding connected to the windings of said potentiometer and having its primary windings connected in opposition in circuits extending over the cathode-anode paths of said devices respectively, a source of potential connected to the mid-point between the primary windings of said transformer for supplying current to said circuits, a potentiometer operable by the altimeter shaft of said trainer for varying said current in accordance with the assumed altitude at which the simulated flight is being made, a generator driven by the air speed motor of said trainer for the biasing of one of said devices to unbalance the circuits through the primary windings of said transformer in accordance with a change in the air speed of the simulated flight, a generator driven by the altimeter motor of said trainer for the biasing of the other of said devices to unbalance the circuits through the primary windings of said transformer in accordance with a change in the altitude incident to climbing or diving in the simulated flight, an indicator for indicating the bomb burst location on said map and means controlled by the derived coordinate potentials for controlling said indicator.

14. In an aircraft trainer having steering controls and an altimeter shaft operated in response to said controls, a terrain map, means under the control of a trainee for operating the trainer in simulation of flight over said terrain map, means for simulating the release of a bomb, means for determining potentials proportional to the $x$ and $y$ coordinates of the bomb flight comprising a sine-cosine potentiometer, means for operating the brushes of said potentiometer in accordance with the orientation of the trainer in its simulated flight, two electronic devices, a transformer having its secondary winding connected to the windings of said potentiometer and having its primary windings connected in opposition in circuits extending over the cathode-anode paths of said devices, respectively, a source of potential connected to the mid-point between the primary windings of said transformer for supplying current to said circuits, a generator driven by a steering control of said trainer for the biasing one of said devices to unbalance the circuits through the primary windings of said transformer in accordance with a change in the bearing of the trainer in its simulated flight, a potentiometer operable by the altimeter shaft of said trainer and connected in series with said generator for further biasing of said one device in accordance with the altitude at which the simulated flight is being made, an indicator for indicating the bomb burst location on said map, and means controlled by the derived coordinate potentials for controlling said indicator.

15. In an aircraft trainer having an altimeter shaft operable in response to the control of said trainer in simulation of flight, a terrain map, means under the control of a trainee for operating the trainer in simulation of flight over said terrain map, means for simulating the release of a bomb, means for determining potentials proportional to the $x$ and $y$ coordinates of the bomb flight, means for modifying the potential appertaining to the $y$ coordinate of the bomb flight to correct for the lateral deviation of the bomb in its flight due to the assumed wind, said means comprising a source of potential, a manually operable rheostat for attenuating said potential in accordance with the velocity of the wind, and a potentiometer operable by the altimeter shaft of said trainer for further attenuating said potential in accordance with the altitude at which the simulated flight is being made, an indicator for indicating the bomb blast location on said map and means controlled by said coordinate potentials for controlling said indicator.

RICHARD C. DEHMEL.

REFERENCES CITED

The following references are of record in the file of this patent:

UNITED STATES PATENTS

| Number | Name | Date |
| --- | --- | --- |
| 2,313,480 | Reid | Mar. 9, 1943 |
| 2,326,764 | Crane | Aug. 17, 1943 |
| 2,332,523 | Norden | Oct. 26, 1943 |
| 2,346,693 | Lyman | Apr. 18, 1944 |